US012397812B2

(12) United States Patent
Okumura

(10) Patent No.: US 12,397,812 B2
(45) Date of Patent: Aug. 26, 2025

(54) NAVIGATION SYSTEM

(71) Applicant: TOYOTA JIDOSHA KABUSHIKI KAISHA, Toyota Aichi-ken (JP)

(72) Inventor: Yasutomo Okumura, Nagoya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/522,678

(22) Filed: Nov. 29, 2023

(65) Prior Publication Data

US 2024/0208526 A1 Jun. 27, 2024

(30) Foreign Application Priority Data

Dec. 22, 2022 (JP) ................ 2022-206028

(51) Int. Cl.
| | |
|---|---|
| *B60Q 1/00* | (2006.01) |
| *B60K 35/28* | (2024.01) |
| *B60W 30/095* | (2012.01) |
| *B60W 40/04* | (2006.01) |
| *B60W 50/14* | (2020.01) |

(52) U.S. Cl.
CPC ............ *B60W 50/14* (2013.01); *B60K 35/28* (2024.01); *B60W 30/0956* (2013.01); *B60W 40/04* (2013.01); *B60K 2360/178* (2024.01); *B60W 2050/146* (2013.01); *B60W 2554/406* (2020.02); *B60W 2555/20* (2020.02); *B60W 2556/10* (2020.02); *B60W 2556/45* (2020.02)

(58) Field of Classification Search
CPC .. B60W 50/14; B60W 30/0956; B60W 40/04; B60W 2050/146; B60W 2554/406; B60W 2555/20; B60K 35/28; B60K 2360/178
USPC ......................................................... 340/438
See application file for complete search history.

(56) References Cited

U.S. PATENT DOCUMENTS

| | | | |
|---|---|---|---|
| 5,270,708 A | 12/1993 | Kamishima | |
| 2001/0020902 A1* | 9/2001 | Tamura ............. | G01C 21/3697 340/936 |
| 2014/0191884 A1* | 7/2014 | Maeda ................ | H04W 4/40 340/944 |
| 2016/0061625 A1* | 3/2016 | Wang ................. | G01C 21/3697 701/454 |
| 2018/0299284 A1* | 10/2018 | Wang .................. | G08G 1/0112 |
| 2023/0017376 A1* | 1/2023 | Stenneth ............ | G01C 21/3492 |
| 2024/0062656 A1* | 2/2024 | Forscher ............. | G08G 1/163 |

FOREIGN PATENT DOCUMENTS

| | | |
|---|---|---|
| JP | H04-309810 A | 11/1992 |
| JP | H10-332409 A | 12/1998 |
| JP | 2005-351719 A | 12/2005 |

(Continued)

*Primary Examiner* — Tai T Nguyen
(74) *Attorney, Agent, or Firm* — Dinsmore & Shohl LLP

(57) ABSTRACT

A navigation system, including: a memory; a display; and a processor coupled to the memory and to the display, the processor being configured to: at a time of route guidance for a host vehicle, estimate an aspect of an accident at a vicinity of the route and a risk of the accident; and control the display so as to display objects indicating a collision target corresponding to the aspect of the accident, with a number of the objects corresponding to a level of the risk.

5 Claims, 5 Drawing Sheets

(56) References Cited

FOREIGN PATENT DOCUMENTS

| | | | |
|---|---|---|---|
| JP | 2006-163973 | A | 6/2006 |
| JP | 2021-157637 | A | 10/2021 |
| JP | 2021-182189 | A | 11/2021 |

* cited by examiner

NAVIGATION SYSTEM

CROSS-REFERENCE TO RELATED APPLICATION

This application claims priority under 35 USC 119 from Japanese Patent Application No. 2022-206028, filed on Dec. 22, 2022, the disclosure of which is incorporated by reference herein.

BACKGROUND

Technical Field

The present disclosure relates to a navigation system capable of displaying a risk of accident.

Related Art

In route guidance using a navigation system, there are cases in which high-accident location exist along a route.

Japanese Patent Application Laid-open (JP-A) No. 2006-163973, discloses a safe driving assistance system that presents a driver with places requiring caution in terms of traffic safety.

However, although the system described in JP-A No. 2006-163973, uses text, symbols, or the like to indicate places requiring caution on travel route, the level of risk of such places requiring caution is hard to be visually recognized.

SUMMARY

The present disclosure provides a navigational system that enables visual recognition of a risk of an accident on a route.

A first aspect of the present disclosure is a navigation system that includes: a memory; a display; and a processor coupled to the memory and to the display, the processor being configured to: at a time of route guidance for a host vehicle, estimate an aspect of an accident at a vicinity of the route and a risk of the accident; and control the display so as to display objects indicating a collision target corresponding to the aspect of the accident, with a number of the objects corresponding to a level of the risk.

According to the navigation system of the first aspect of the present disclosure, by displaying objects indicating a collision target with a number corresponding to the estimated level of the risk, the risk of an accident on a route may be made visually recognized.

In a second aspect of the present disclosure, in the first aspect, the processor may be configured to display the objects with animation that changes position at a screen of the display, and increases the number of the objects in a case in which the risk of the accident is higher.

According to the navigation system of the second aspect of the present disclosure, by displaying objects indicating the collision target using an animation with a high visual effect, and displaying more objects the higher the risk of the accident is, the risk of an accident on the route may be made visually recognized.

In a third aspect of the present disclosure, in the second aspect, in accordance with the aspect of the accident, the animation may be displayed so as to be one or more of, head-on, crossing, or side-on, with respect to the host vehicle on the route.

According to the navigation system of the third aspect of the present disclosure, by animation corresponding to the type of accident, the risk of the accident on the route may be made visually recognized.

In a fourth aspect of the present disclosure, in the above aspects, the processor may be configured to estimate the aspect of the accident and the risk of the accident, by using at least one of geometric features of the route, information on a surrounding environment of the route, information on traffic conditions on the route, and weather information of the route, acquired from an external source.

According to the navigation system of the fourth aspect of the present disclosure, the current risk of the accident may be estimated based on the latest information acquired from the external source.

In a fifth aspect of the present disclosure, in the fourth aspect, the processor may be configured to estimate the aspect of the accident and the risk of the accident, by using a learned model obtained by machine learning using, as training data, an aspect of an accident and a risk of an accident corresponding to at least one of historical accident records, traffic conditions, or weather conditions.

According to the navigation system of the fifth aspect of the present disclosure, by appropriate machine learning, a system that may prompt an user to visually recognize the risk of the accident on the rout, may be constructed.

According to the above aspects, the navigational system according to the present disclosure may prompt the user to visually recognize the risk of the accident on the route.

BRIEF DESCRIPTION OF THE DRAWINGS

Exemplary embodiments will be described in detail based on the following figures, wherein.

DETAILED DESCRIPTION

Figure 1:
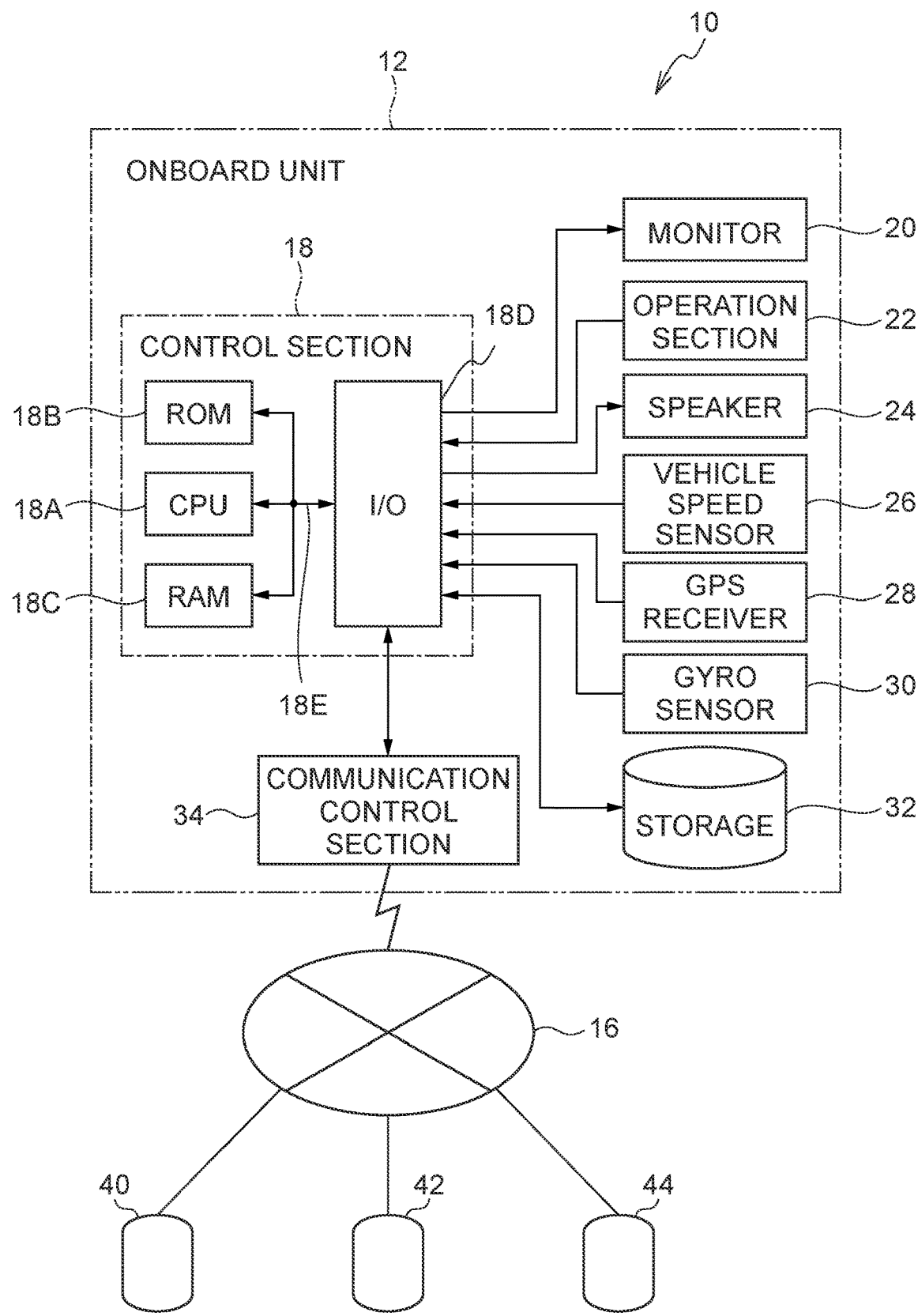
FIG. 1 is a block diagram illustrating configuration of a navigation system according to the present exemplary embodiment.

Explanation follows regarding a navigation system 10 according to the present exemplary embodiment, with reference to FIG. 1. The navigation system 10 illustrated in FIG. 1 is a server network system in which, an onboard unit 12 installed in a vehicle, a map database (DB) server 40, a traffic information server 42, and a weather information server 44, are connected to a network 16.

As illustrated in FIG. 1, the onboard unit 12 includes a control section 18 configured by a computer including a central processing unit (CPU) 18A, read only memory (ROM) 18B, random access memory (RAM) 18C, and an input/output interface (I/O) 18D, connected to a bus 18E.

The ROM 18B stores a program or the like for route guidance to a destination. The program stored in the ROM 18B is expanded in the RAM 18C and executed by the CPU 18A to perform control for route guidance to a destination.

The I/O 18D is connected to a monitor 20, an operation section 22, a speaker 24, a vehicle speed sensor 26, a global positioning system (GPS) receiver 28, a gyro sensor 30, a storage 32, and a communication control section 34. Note that the I/O 18 D and the respective sections may be connected through an onboard network such as a controller area network (CAN).

The monitor 20 is provided on a center console or the like inside the vehicle cabin, and displays a map or the like for route guidance to a set destination.

The operation section 22 includes a touch panel, a switch, or the like for inputting setting of the destination, and the like. Operating the operation section 22 enables registration of a home point, setting of the destination, instructions to re-search the route, and the like.

The speaker 24 generates sounds such as speech or audio for route guidance to the set destination.

The vehicle speed sensor 26 detects a travel speed (hereafter referred to as vehicle speed) of the vehicle, and outputs the detection result to the control section 18.

The GPS receiver 28 receives a GPS signal including time information from a GPS satellite, and outputs the received result to the control section 18. The control section 18 calculates the vehicle position based on the plural GPS signals, and obtains vehicle position information.

The gyro sensor 30 detects acceleration, angular acceleration, angular velocity, and the like, and outputs the detection results to the control section 18. This enables the control section 18 to detect the vehicle attitude based on the detection results of the gyro sensor 30.

The storage 32 stores map information for performing route guidance to the set destination, and the control section 18 performs route guidance to the set destination based on the map information stored in the storage 32. The storage 32 also stores a travel history, consisting of position calculation results of the host vehicle position, as a path history.

The communication control section 34 communicates with the network 16 to exchange information with each of the map DB server 40, the traffic information server 42, and the weather information server 44.

Figure 2:
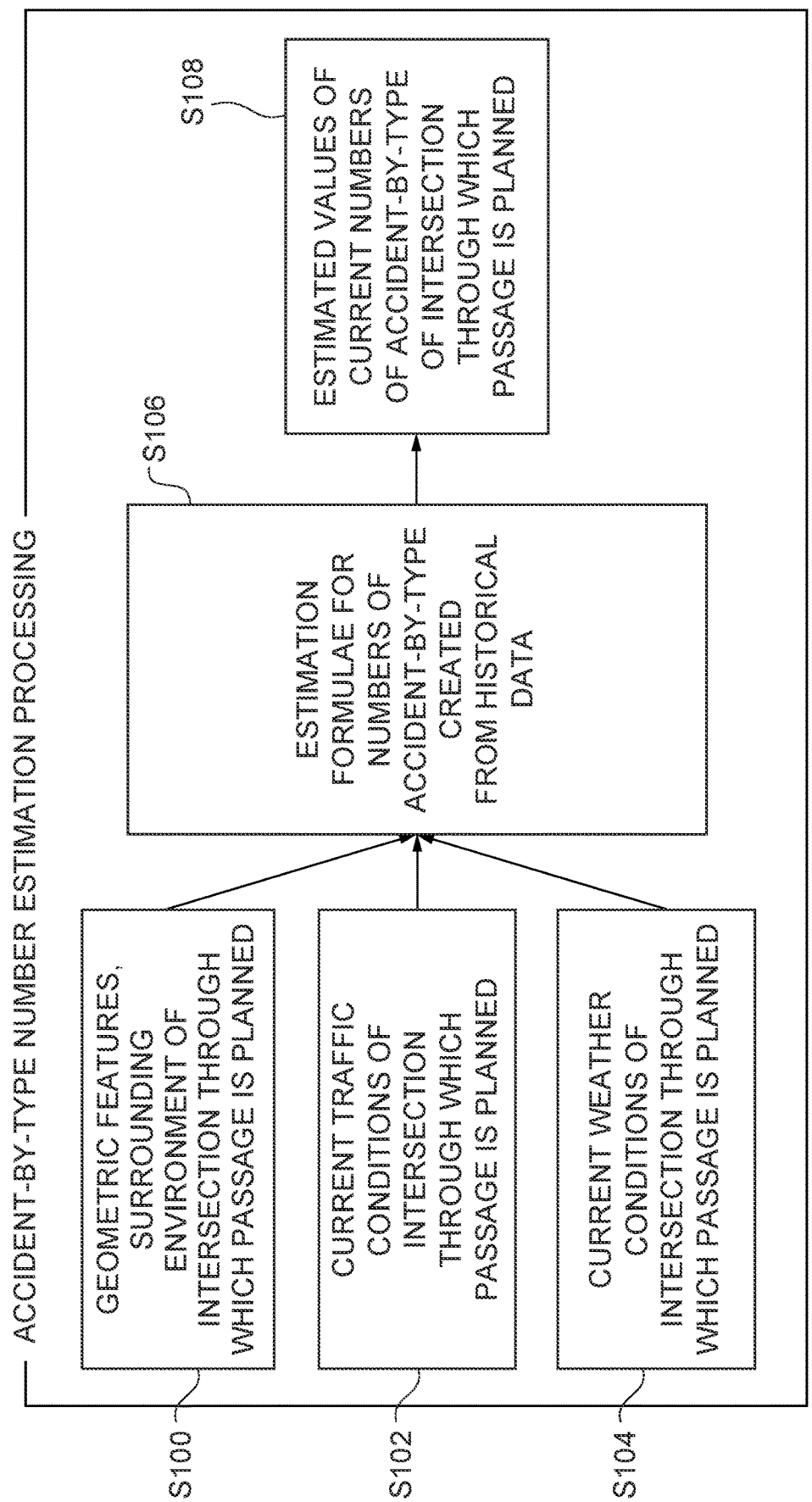
FIG. 2 is a functional block diagram illustrating accident-by-type estimation processing performed by a control section of a navigation system according to the present exemplary embodiment.

FIG. 2 is a functional block diagram illustrating an example of accident-by-type estimation processing, performed by the control section 18 of the navigation system according to the present exemplary embodiment. At step S100, the geometric characteristics of an intersection through which passage is planned, and information relating to the peripheral environment around the intersection, are acquired from the map DB server 40.

At step S102, information relating to current traffic conditions at the intersection through which passage is planned, is acquired from the traffic information server 42.

At step S104, information relating to current weather conditions at the intersection through which passage is planned, is acquired from the weather information server 44.

At step S106, estimation formulae to estimate the numbers of accident-by-type are constructed using learned models. The learned models are acquired by machine learning, using an aspect of an accident and a risk of accident, with respect to at least one of a record of historical accidents, traffic conditions or weather conditions, as training data.

At step S108, the estimation formulae for numbers of accident-by-type, and the information acquired from each of the map DB server 40, the traffic information server 42, and the weather information server 44, are used to output estimated values of current numbers of accident-by-type, at the intersection through which passage is planned. The estimated values of the numbers of accident-by-type are used as an indicator of the level of risk of traffic accidents, as described below.

In the present exemplary embodiment, in a case in which the aspect of passage of the host vehicle at the intersection, matches with the high-risk type of traffic accident, an animation is displayed on the monitor 20, in which number of objects simulating the collision target moves. Here, the number corresponds to the level of the risk.

Figure 3A:
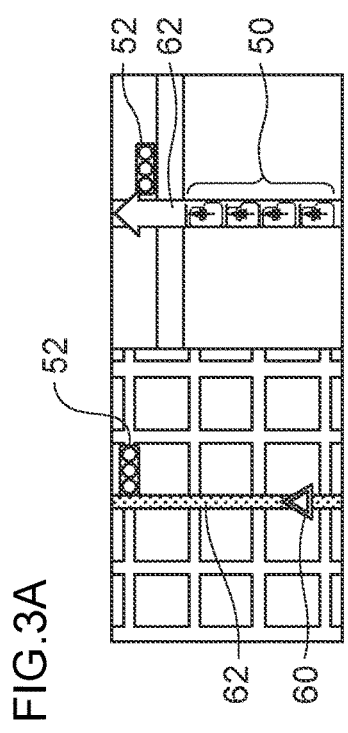
FIG. 3A is an example of a display of a monitor in a case in which a host vehicle travels straight ahead and passes through an intersection with a traffic signal.

FIG. 3A is an example of a display on the monitor 20, in a case in which the host vehicle 60 travels, as indicated by the travel path 62, straight ahead and passes through the intersection with a traffic signal 52. The left side of FIG. 3A is the map display of route guidance, and the right side of FIG. 3A is an animation illustrating an enlarged display of the vicinity of the intersection.

In a case in which the estimated values of the numbers of accident-by-type output at step S108 indicate that the risk of a rear-end collision is high, at the intersection with the traffic signal 52, in the present exemplary embodiment, as illustrated in the right side of FIG. 3A, an object 50 is displayed as a collision target in which the host vehicle 60 might collide. Although plural objects 50 are displayed in FIG. 3A, in the present exemplary embodiment, in a case in which the estimated numbers of accident-by-type is high, the number of displayed objects 50 becomes larger.

Figure 3B:
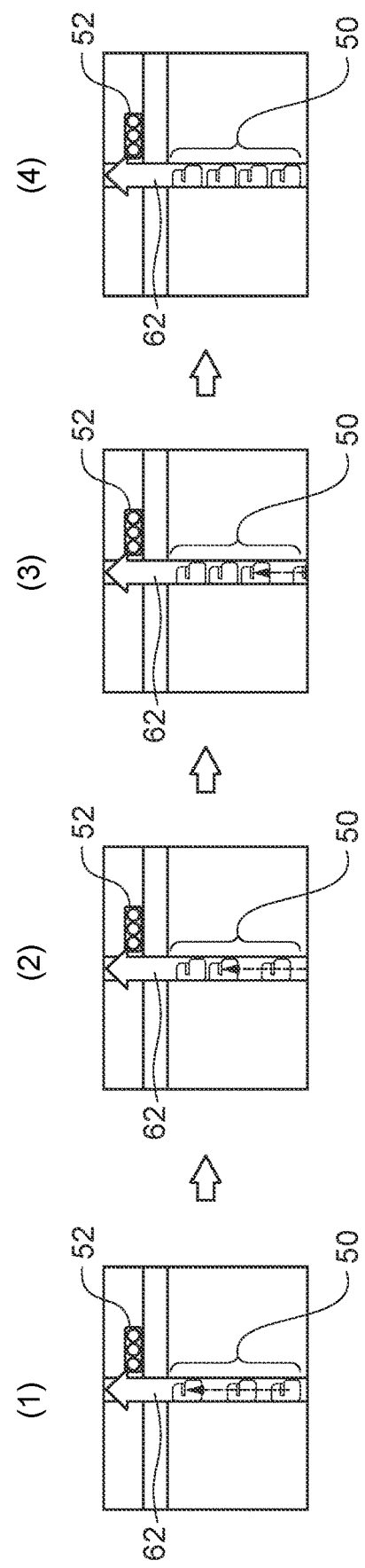
FIG. 3B is a diagram illustrating changes in a time series of the display of objects at the intersection with the traffic signal.

FIG. 3B is an explanatory diagram illustrating examples of changes in a time series of displays of the objects 50 at the intersection with the traffic signal 52. In the present exemplary embodiment, number of objects 50 that corresponds to the risk represented by the estimated numbers of accident-by-type is not displayed all at once, and rather, as illustrated in (1) of FIG. 3B, first, a situation is displayed in which the first object 50 approaches the intersection, and next, as illustrated in (2) of FIG. 3B, a situation in which another object 50 approaches the intersection is displayed. Moreover, as illustrated in (3) of FIG. 3B, objects 50 are added in accordance with the risk, and finally, as illustrated in (4) of FIG. 3B, four objects 50 are displayed.

As illustrated in FIG. 3B, by displaying an animation of a situation in which the collision target object 50 approaches the intersection with one or more of the objects 50, drivers may be alerted against rear-end collisions.

Figure 4A:
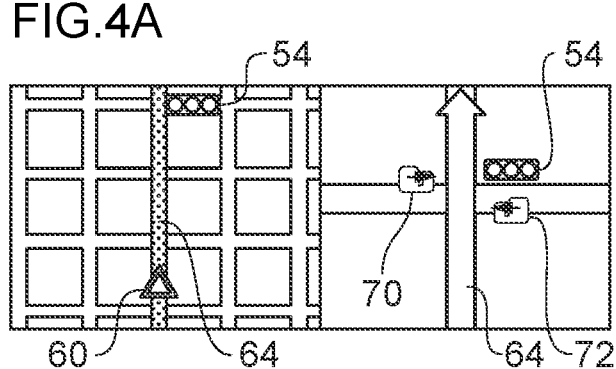
FIG. 4A is an example of a display of a monitor in a case in which the host vehicle travels straight ahead and passes through the intersection with the traffic signal.

FIG. 4A is an example of a display on the monitor 20, in a case in which the host vehicle 60 travels straight ahead and passes through an intersection with a traffic signal 54, as indicated by travel path 64. In a case in which the estimated values of the numbers of accident-by-type indicate that there is a high risk of a side-on collision at the intersection, in the present exemplary embodiment, as illustrated in the right-hand side of FIG. 4A, objects 70, 72 simulating other vehicles crossing the travel path 64 are displayed in numbers corresponding to the risk.

Figure 4B:
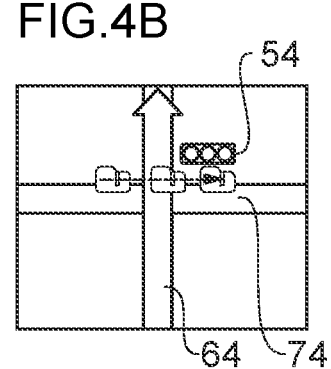
FIG. 4B is an example of an animated display in a case in which the host vehicle travels straight ahead and passes through the intersection with the traffic signal.

FIG. 4B is an example of an animation display, in a case in which the host vehicle 60 travels straight ahead and passes through the intersection with the traffic signal 54, as indicated by the travel path 64. Since the object 74 that simulates another vehicle crossing the travel path 64 is shown crossing the travel path 64 of the host vehicle 60, drivers may be alerted against side-on collisions.

Figure 4C:
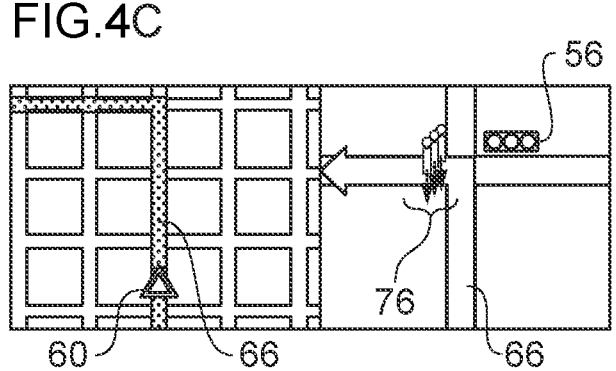
FIG. 4C is an example of a display of a monitor in a case in which the host vehicle turns left and passes through the intersection with the traffic signal.

FIG. 4C is an example of a display on the monitor 20, in a case in which the host vehicle 60 turns left and passes through the intersection with a traffic signal 56, as indicted by the travel path 66. In a case in which the estimated values of the numbers of accident-by-type indicate that there is a high risk of a left-turn accident at the intersection, in the present exemplary embodiment, as illustrated in the right-hand side of FIG. 4C, the object 76 simulating a pedestrian crossing the travel path 66 is displayed in a number corresponding to the risk.

Figure 4D:
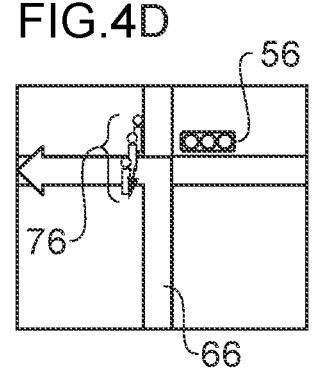
FIG. 4D is an example of an animated display in a case in which the host vehicle turns left and passes through the intersection with the traffic signal.

FIG. 4D is an example of an animation display, in a case in which the host vehicle 60 turns left and passes through an intersection with the traffic signal 56, as indicated by the travel path 66. Since the object 76 simulating a pedestrian crossing the travel path 66 is shown crossing the travel path 66 of the host vehicle 60 at the intersection with the traffic signal 56, drivers may be alerted against left-turn accidents.

Figure 4E:
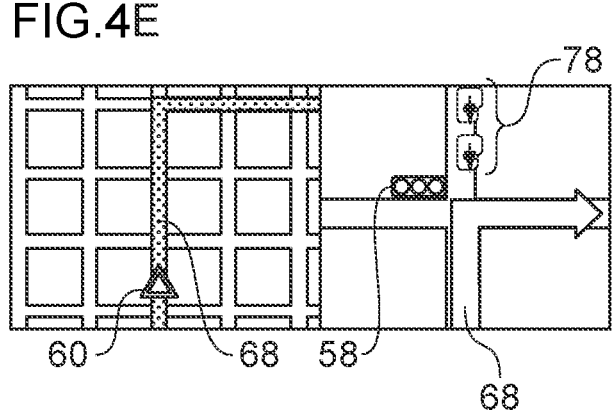
FIG. 4E is an example of a display of a monitor in a case in which the host vehicle turns right and passes through the intersection with the traffic signal.

FIG. 4E is an example of a display on the monitor 20, in a case in which the host vehicle 60 turns right and passes through the intersection with a traffic signal 58, as indicated by the travel path 68. In a case in which the estimated values of the numbers of accident-by-type indicate that there is a high risk of a right-turn accident at the intersection having the traffic signal 58, in the present exemplary embodiment, as illustrated in the right-hand side of FIG. 4E, the object 78 simulating another vehicle traveling in the opposite direction in the travel path 68 is displayed in a number corresponding to the risk.

Figure 4F:
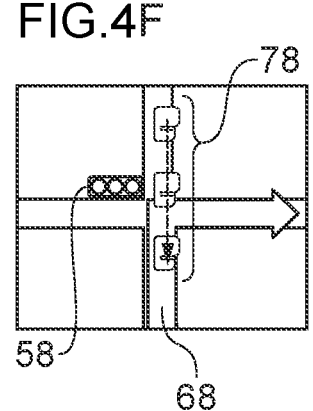
FIG. 4F is an example of an animated display in a case in which the host vehicle turns right and passes through the intersection with the traffic signal.

FIG. 4F is an example of an animation display, in a case in which the host vehicle 60 turns right and passes through the intersection with the traffic signal 58, as indicated by the travel path 68. Since an object 78 simulating another vehicle traveling in the opposite direction in the travel path 68 is illustrated as entering the intersection with the traffic signal 58, drivers may be alerted against right-turn accidents.

In the present exemplary embodiment, in addition to the objects 50, 70 and the like simulating another vehicle, and the object 76 simulating a crossing pedestrian, respective objects simulating a motorcycle and a bicycle may be displayed in an animation.

Figure 5A:
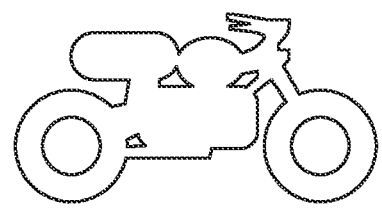
FIG. 5A is an example of an object indicating a motorcycle.
Figure 5B:
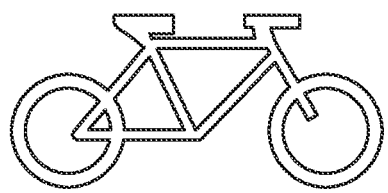
FIG. 5B is an example of an object indicating a bicycle.

FIG. 5A is an example of the object simulating the motorcycle, and FIG. 5B is an example of the object simulating the bicycle. In a case in which the estimated values of the numbers of accident-by-type output at step S108 in FIG. 2 indicate that there is a possibility of a collision with a motorcycle or a bicycle, animation display of the object illustrated in FIG. 5A or FIG. 5B enables the driver to be alerted.

As described above, according to the navigation system 10 of the present exemplary embodiment, by displaying objects that indicate the collision target according to the type of accident, such as head-on, crossing, or side-on, with respect to the host vehicle on a route, in a number corresponding to the estimated level of risk, the risk of the accident on the route may be made visually recognized.

Moreover, by displaying objects that indicate the collision target using an animation with a high visual effect, and also displaying more objects as the risk of the accident increases, the risk of an accident on a route may be quickly and visually recognized.

Moreover, based on the latest information acquired from external servers, such as the map DB server 40, the traffic information server 42, and the weather information server 44, the risk of the accident is estimated, and by displaying animation of objects according to the type of accident, the risk of the accident at the present time may be visually recognized.

What is claimed is:

1. A navigation system, comprising:
a memory;
a display; and
a processor coupled to the memory and to the display, the processor being configured to:
at a time of route guidance for a host vehicle, estimate an aspect of an accident at a vicinity of the route and a risk of the accident; and
control the display so as to display objects indicating a collision target corresponding to the aspect of the accident, with a number of the objects corresponding to a level of the risk;
estimate the aspect of the accident and the risk of the accident, by using at least one of geometric features of the route, information on a surrounding environment of the route, information on traffic conditions on the route, and weather information of the route, acquired from an external source; and
estimate the aspect of the accident and the risk of the accident, by using a learned model obtained by machine learning using, as training data, the aspect of the accident and the risk of the accident corresponding to at least one of historical accident records, traffic conditions, or weather conditions.

2. The navigation system of claim 1, wherein the processor is configured to display the objects with animation that changes position at a screen of the display, and increases the number of the objects in a case in which the risk of the accident is higher.

3. The navigation system of claim 2, wherein, in accordance with the aspect of the accident, the animation is displayed so as to be one or more of, head-on, crossing, or side-on, with respect to the host vehicle on the route.

4. The navigation system of claim 1, wherein the processor is configured to display the objects at a different position of the display, according to the aspect of the accident.

5. The navigation system of claim 1, wherein the processor is configured to:
in a case in which the aspect of the accident corresponds to a rear-end collision accident at an intersection, display the objects simulating another vehicle at a position at a near side of the intersection;
in a case in which the aspect of the accident corresponds to a side-on collision at the intersection, display the objects simulating another vehicle at a position crossing the route of the host vehicle;
in a case in which the aspect of the accident corresponds to a left-turn accident at the intersection, display the object simulating a pedestrian at a position crossing the route of the host vehicle; and
in a case in which the aspect of the accident corresponds to a right-turn accident at the intersection, display the object simulating another vehicle traveling in the opposite direction at a position of an oncoming lane of the host vehicle.

\* \* \* \* \*